United States Patent
Westenberg et al.

(10) Patent No.: US 12,391,817 B2
(45) Date of Patent: Aug. 19, 2025

(54) FUNCTIONALIZED CARBON BLACK, PREPARATION THEREOF AND USE IN VULCANIZABLE RUBBER COMPOSITIONS

(71) Applicant: Orion Engineered Carbons IP GmbH & Co. KG, Monheim (DE)

(72) Inventors: Hauke Westenberg, Cologne (DE); Conny Vogler, Ruppichteroth (DE); Werner Niedermeier, Bruehl (DE); Dirk Rechenbach, Eppstein (DE); Arndt-Peter Schinkel, Marienhausen (DE)

(73) Assignee: Orion Engineered Carbons IP GmbH & Co. KG, Monheim (DE)

( * ) Notice: Subject to any disclaimer, the term of this patent is extended or adjusted under 35 U.S.C. 154(b) by 743 days.

(21) Appl. No.: 17/624,035

(22) PCT Filed: Jun. 18, 2020

(86) PCT No.: PCT/EP2020/066887
§ 371 (c)(1),
(2) Date: Dec. 30, 2021

(87) PCT Pub. No.: WO2021/001156
PCT Pub. Date: Jan. 7, 2021

(65) Prior Publication Data
US 2022/0363864 A1   Nov. 17, 2022

(30) Foreign Application Priority Data
Jul. 2, 2019 (EP) .................................... 19183848

(51) Int. Cl.
| | | |
|---|---|---|
| *C08K 3/04* | (2006.01) |
| *B60C 1/00* | (2006.01) |
| *C08F 212/08* | (2006.01) |
| *C08F 236/06* | (2006.01) |
| *C08K 3/22* | (2006.01) |
| *C08K 5/19* | (2006.01) |
| *C08K 5/372* | (2006.01) |
| *C08K 9/04* | (2006.01) |

(52) U.S. Cl.
CPC .............. *C08K 3/04* (2013.01); *B60C 1/0016* (2013.01); *B60C 1/0025* (2013.01); *C08F 212/08* (2013.01); *C08F 236/06* (2013.01); *C08K 3/22* (2013.01); *C08K 5/19* (2013.01); *C08K 5/3725* (2013.01); *C08K 9/04* (2013.01); *C08K 2003/2206* (2013.01); *C08K 2003/2217* (2013.01)

(58) Field of Classification Search
CPC ... C08K 3/04; C08K 3/22; C08K 5/19; C08K 5/3725; C08K 9/04; C08K 2003/2206; C08K 2003/2217; B60C 1/0016; B60C 1/0025; C08F 212/08; C08F 236/06; C08L 9/06; C09C 1/56; C09C 3/08
See application file for complete search history.

(56) References Cited

U.S. PATENT DOCUMENTS

| | | | |
|---|---|---|---|
| 5,248,722 A | 9/1993 | DeTrano et al. | |
| 5,686,536 A | 11/1997 | Poyner et al. | |
| 6,120,594 A | 9/2000 | Curtis et al. | |
| 6,471,933 B1 | 10/2002 | Dotson | |
| 10,640,630 B2 | 5/2020 | Belmont et al. | |
| 10,800,906 B2 * | 10/2020 | Coe .......................... C08J 11/00 | |
| 2013/0046064 A1 * | 2/2013 | Herd ........................ C08L 15/00 525/333.1 |
| 2015/0183962 A1 * | 7/2015 | Belmont .................. C09C 1/48 524/105 |
| 2018/0171114 A1 | 6/2018 | Jiang et al. | |
| 2018/0294475 A1 * | 10/2018 | Zhamu .................. H01M 4/624 | |
| 2019/0061424 A1 | 2/2019 | Forciniti et al. | |

FOREIGN PATENT DOCUMENTS

| | | | |
|---|---|---|---|
| EP | 0602912 A1 | 6/1994 |
| EP | 3339364 A1 | 6/2018 |
| JP | H06212026 A | 8/1994 |
| JP | H09227725 A | 9/1997 |
| JP | 09324003 | * 12/1997 |
| JP | 09324003 A | * 12/1997 |
| JP | H9324003 A | 12/1997 |
| JP | 2000248197 A | 9/2000 |
| JP | 2003528192 A | 9/2003 |
| JP | 2008019401 A | 1/2008 |
| JP | 2013241483 A | 12/2013 |

(Continued)

*Primary Examiner* — Peter F Godenschwager
*Assistant Examiner* — Zhen Liu
(74) *Attorney, Agent, or Firm* — The Webb Law Firm

(57) ABSTRACT

The present disclosure provides a functionalized carbon black obtained by treating an oxidized carbon black with a sulfur-containing primary or secondary amine or a salt thereof. The disclosure also relates to a process for preparing such functionalized carbon black. Furthermore, the present disclosure relates a vulcanizable rubber composition including (i) a vulcanizable rubber component, and (ii) an oxidized carbon black and (iii) a sulfur-containing primary or secondary amine or a salt thereof, or a functionalized carbon black formed from these components. The disclosure also concerns an article made from the vulcanizable rubber composition. The functionalized carbon blacks disclosed herein are particularly useful for obtaining rubber compounds with low hysteresis and enhanced abrasion resistance, e.g. for the production of energy-saving tires.

19 Claims, No Drawings

(56) References Cited

FOREIGN PATENT DOCUMENTS

| JP | 5977078 | * | 8/2016 |
| JP | 5977078 B2 | * | 8/2016 |
| KR | 101939496 | * | 1/2019 |
| KR | 101939496 B1 | * | 1/2019 |
| WO | 0170866 A2 | | 9/2001 |
| WO | 2011028337 A2 | | 3/2011 |
| WO | 2013130099 A1 | | 9/2013 |

* cited by examiner

FUNCTIONALIZED CARBON BLACK, PREPARATION THEREOF AND USE IN VULCANIZABLE RUBBER COMPOSITIONS

CROSS-REFERENCE TO RELATED APPLICATIONS

This application is the United States national phase of International Application No. PCT/EP2020/066887 filed Jun. 18, 2020, and claims priority to European Patent Application No. 19183848.1 filed Jul. 2, 2019, the disclosures of which are hereby incorporated by reference in their entirety.

TECHNICAL FIELD

The present disclosure relates to functionalized carbon blacks, related vulcanizable rubber compositions and articles made therefrom as well as respective preparation processes. More particularly, the disclosure concerns a functionalized carbon black obtainable by treating an oxidized carbon black with a sulfur-containing amine. The functionalized carbon blacks are particularly useful for obtaining rubber products with reduced hysteresis and good abrasion resistance such as in tire applications.

TECHNICAL BACKGROUND

Carbon blacks are included in many rubber-based compounds, for example for modifying their color, mechanical, electrical, and/or processing properties. Carbon blacks are for instance commonly added to rubber compositions used to fabricate tires or components thereof to impart electrically dissipative properties to the insulating matrix. At the same time, carbon black additives affect the mechanical and elastic properties, such as stiffness, abrasion resistance and hysteresis, which affect to a great extent the performance of the resulting tire, e.g. in terms of its rolling resistance and durability. Herein, carbon blacks tend to form networks in the matrix via strong filler-filler interactions, which are the main source of heat-build up in the rubber component. Due to increasing regulatory provisions and environmental strains there is an increasing demand for energy-saving tires with a low rolling resistance. At the same time other performance parameters such as grip, traction and durability shall not be adversely affected. This represents often competing requirements.

One option for reducing the energy being lost in form of heat during deformation of a rubber material, which is reflected by a lower value of hysteresis, resides in reducing the filler-filler interactions by increasing the interactions of the carbon black filler with the rubber matrix. The hysteresis may also be reduced by reducing the carbon black loading and/or increasing the particle size of the carbon black. However, this may concomitantly degrade e.g. the electrically dissipative properties and/or the mechanical properties such as abrasion resistance, fracture resistance or chipping resistance.

Alternatively, there have been developments to chemically modify the rubber material and/or to the carbon black filler in order to strengthen the filler-rubber interactions.

For example, U.S. Pat. No. 5,248,722 describes elastomeric compositions with reduced rolling resistance in tire tread applications by utilizing terminally functionalized polymers in combination with acid-functional oxidized carbon black. The terminally functionalized polymers however are not readily available and need to be prepared in a dedicated step by reacting a tin or nitrogen containing compound with a polymer prepared by polymerization of at least one diene monomer and optionally one or more vinyl substituted aromatic monomers.

According to WO 2011/028337 the use of surface-treated carbon blacks in conjunction with a functionalized SBR polymer having functionalization in terms of oxygen-containing groups such as carboxylic acid or hydroxyl groups along the chain enhances carbon black-elastomer interaction and yields reductions in hysteresis and benefits in wet traction relative to the use of conventional carbon black containing compounds. Again, this approach however requires the use of specialty polymeric materials.

EP 3 339 364 proposes to utilize an oxidized carbon black in conjunction with a polymeric amine having a primary amine functionality such as a polyethyleneimine to obtain rubber compounds with improved hysteresis for tires with low rolling resistance. The abrasion resistance is however somewhat degraded in the resulting rubber compounds.

It would be desirable though to provide rubber compounds which exhibit improved hysteresis and at the same time enhanced abrasion resistance, e.g. for the production of tires with a low rolling resistance and good durability. The remaining mechanical properties of such rubber compound should be suitable for tire applications.

Accordingly, it is an objective of the present invention to provide a functionalized carbon black that can impart the above-mentioned properties to rubber compounds alleviating or avoiding the disadvantages of the prior art. Functionalization of the carbon blacks should be achievable in an efficient and economic manner making use of readily available components and processing techniques. The present invention aims to provide vulcanizable rubber composition that yield both improved hysteresis and enhanced abrasion resistance suitable for the production of tires.

SUMMARY OF INVENTION

It has now surprisingly been found that the above objective can be achieved by a functionalized carbon black obtained by treating an oxidized carbon black with a sulfur-containing primary or secondary amine or a salt thereof.

The functionalized carbon blacks of the present invention can be obtained by a process comprising:
(A) providing an oxidized carbon black,
(B) contacting the oxidized carbon black with a sulfur-containing primary or secondary amine or a salt thereof, and
(C) subjecting the resulting mixture to conditions at which the oxidized carbon black reacts with the sulfur-containing primary or secondary amine or salt thereof.

Herein, the functionalized carbon blacks according to the invention may be treated with the sulfur-containing primary or secondary amine or salt thereof in-situ during preparation of a vulcanizable rubber composition or separately, for example to obtain the functionalized carbon black material as such.

The present invention accordingly also concerns a vulcanizable rubber composition comprising:
(i) a vulcanizable rubber component,
(ii) an oxidized carbon black, and
(iii) a sulfur-containing primary or secondary amine or a salt thereof, or
(i) a vulcanizable rubber component, and a functionalized carbon black according to the present invention formed from (ii) an oxidized carbon black and (iii) a sulfur-containing primary or secondary amine or salt thereof.

Also within the scope of the present invention are articles prepared from the vulcanizable rubber compositions of the present invention.

Moreover, the present invention generally relates to the use of a sulfur-containing primary or secondary amine or a salt thereof for surface modification of an oxidized carbon black and/or as coupling agent in carbon black containing vulcanizable rubber compositions.

The functionalized carbon blacks according to the invention can be obtained from commercially available ingredients using common processing techniques in an efficient manner at low costs. They have been found to impart favorable combinations of properties to rubber compounds to which they are added to or in which they are formed, particularly yielding a significantly reduced hysteresis and an enhanced abrasion resistance, rendering them particularly interesting for the production of energy-saving tires.

Without intending to be bound by any theory, it is believed that the use of a sulfur-containing primary or secondary amine by its bifunctionality, i.e. sulfur functionality and amine functionality with one or more N—H moieties, enables to form strong interactions, e.g. by covalent bonds and/or by hydrogen bonds, to oxidized carbon blacks, which generally have polar oxygen-containing groups at their surface, on the one hand and vulcanizable rubber components, which generally contain vulcanizable moieties such as ethylenically unsaturated groups having an affinity towards sulfur-containing moieties, on the other hand. Thus, an effective coupling of the functionalized carbon blacks to the rubber component can be achieved and the filler-filler interactions be efficiently reduced resulting in rubber compounds with low hysteresis and high durability and mechanical stiffness.

The present invention is thus also drawn to the use of a sulfur-containing primary or secondary amine or a salt thereof in carbon black containing vulcanizable rubber compositions for reducing the loss factor tan $\alpha$ (e.g. measured at 60° C.) and/or reducing the heat build-up and/or increasing the bound rubber content and/or enhancing the abrasion resistance compared to a corresponding carbon black containing vulcanizable rubber composition not containing the sulfur-containing primary or secondary amine or functionalized carbon black derived therefrom.

These and other optional features and advantages of the present invention are described in more detail in the following description.

DETAILED DESCRIPTION

As used herein, the term "comprising" is understood to be open-ended and to not exclude the presence of additional undescribed or unrecited elements, materials, ingredients or method steps. The terms "including", "containing" and like terms are understood to be synonymous with "comprising". As used herein, the term "consisting of" is understood to exclude the presence of any unspecified element, ingredient or method step.

As used herein, the singular form of "a", "an", and "the" include plural referents unless the context clearly dictates otherwise.

Unless indicated to the contrary, the numerical parameters and ranges set forth in the following specification and appended claims are approximations. Notwithstanding that the numerical ranges and parameters setting forth the broad scope of the invention are approximations, the numerical values set forth in the specific examples are reported as precisely as possible. Any numerical values, however, contain errors necessarily resulting from the standard deviation in their respective measurement.

Also, it should be understood that any numerical range recited herein is intended to include all subranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g. 1 to 6.3, or 5.5 to 10, or 2.7 to 6.1.

As mentioned above, the present invention relates to a functionalized carbon black obtained by treating an oxidized carbon black with a sulfur-containing primary or secondary amine or a salt thereof.

A "carbon black" as referred to herein is a material composed substantially, e.g. to more than 90 wt. % or more than 95 wt. %, based on its total weight, of carbon that is produced by controlled partial pyrolysis from one or more hydrocarbon precursors. Different industrial processes are known for the production of carbon black materials such as the furnace process, gas black process, acetylene black process, thermal black process or lamp black process. The production of carbon blacks is per se well known in the art and for example outlined in J.-B. Donnet et al., "Carbon Black: Science and Technology", 2nd edition, therefore being not described herein in more detail. The carbon black used in the practice of the present invention can also comprise a mixture of two or more different carbon black grades.

The term "oxidized carbon black" as used herein refers to a carbon black that has been subjected to an oxidative treatment and thus comprises oxygen-containing functional groups. The oxygen-containing functional groups can in particular be present at the surface of carbon black particles. The oxygen-containing functional groups can be exemplified, but are not limited to, quinone, carboxyl, phenol, lactol, lactone, anhydride and ketone groups. Carboxylic acid or anhydride groups on the surface of the carbon black particles are herein believed to be particularly favorable for forming strong interactions with the sulfur-containing amine component due to the capability of these polar groups of forming relatively strong bonds e.g. by salt formation, formation of hydrogen bonds or reaction forming e.g. covalent amide bonds.

Oxidized carbon blacks suitable in the practice of the present invention can be produced by any method conventionally known in the art of carbon black oxidation and as for example disclosed in U.S. Pat. Nos. 6,120,594 and 6,471,933. Suitable methods include oxidation of a carbon black material with an oxidizing agent as for example peroxides such as hydrogen peroxide, persulfates such as sodium and potassium persulfates, hypohalites such as sodium hypochlorite, ozone or oxygen gas, transition metal-containing oxidants such as permanganate salts, osmium tetroxide, chromium oxides, ceric ammonium nitrates or oxidizing acids such as nitric acid or perchloric acid, and mixtures or combinations thereof or oxidation followed by treatment with a base, or chlorination followed by treatment with a base.

Oxidized carbon blacks, unlike non-oxidized carbon blacks, have a notable oxygen content. The degree of oxidation of the oxidized carbon black used in the practice of the invention can vary. For example, oxidized carbon blacks can have an oxygen content of 0.5 wt. % or more, such as 1 wt. % or more, or 2 wt. % or more, based on the total weight of the oxidized carbon black material. Typically, the oxygen content does not exceed 20 wt. %, based on the total weight of the oxidized carbon black material. For example, the oxidized carbon black can contain from 0.5 wt. % to 20 wt. %, or from 1 wt. % to 15 wt. %, or from 2 wt. % to 10 wt. %, or from 2 wt. % to 5 wt. % of oxygen, based on the total weight of the oxidized carbon black material.

As mentioned above, the oxidized carbon black used according to the present invention can contain carboxylic acid functionality. For example, the oxidized carbon black can comprise at least 50 µmol carboxylic acid groups per g carbon black, such as in the range of 50 to 500 µmol or from 100 to 300 µmol carboxylic acid groups per g carbon black. The amount of carboxylic acid groups can be determined by titration as set forth in the experimental section below.

The volatile content of the oxidized carbon black measured at 950° C. as set forth in the examples can be at least 1 wt. %, such as in a range of 1-15 wt. %. or 2-8 wt. %.

The oxidized carbon black used according to the invention can in particular have a BET surface area in the range of 10-300 $m^2/g$, typically in the range of 50-300 $m^2/g$ such as of 75-250 $m^2/g$, 90-200 $m^2/g$, 100-175 $m^2/g$ or 125-150 $m^2/g$. The BET surface area can be determined according to ASTM D6556-17.

The oxidized carbon black used according to the invention can further in particular have a specific surface area (STSA) of 10-200 $m^2/g$, such as 50-200 $m^2/g$, 75-175 $m^2/g$, 100-140 $m^2/g$ or 125-140 $m^2/g$. The statistical thickness surface area (STSA) can be determined according to ASTM D6556-17.

The oxidized carbon black used according to the invention can have an oil absorption number (OAN) measured according to ASTM D2414-18 of 50-250 mL/100 g, such as of 75-225 mL/100 g, 90-200 mL/100 g, 100-175 mL/100 g, or 110-160 mL/100 g. The oxidized carbon black according to the invention can further have a compressed oil absorption number (COAN) of 50-150 mL/100 g such as of 75-125 mL/100 g, 90-120 mL/100 g, or 100-120 mL/100 g. The COAN can be determined according to ASTM D3493-18.

The oxidized carbon black according to the present invention can comprise, without being limited thereto, an oxidized furnace black, an oxidized lamp black, an oxidized gas black, or combinations thereof. Preferably the oxidized carbon black comprises an oxidized furnace black. The oxidized carbon black according to the invention can comprise for example carbon black grades commercialized by ORION Engineered Carbon GmbH, e.g. under the tradenames ECORAX®, CORAX® or PRINTEX®, which were subjected to an oxidation treatment as set forth above.

As mentioned above the oxidized carbon black is treated with a sulfur-containing primary or secondary amine or a salt thereof to obtain a functionalized carbon black. Accordingly, the treatment leads to a chemical change of the oxidized carbon black by the sulfur-containing amine imparting functionalities derived from the treatment agent such as sulfur-containing moieties and/or amine groups to the oxidized carbon black. The functionalization can be based on different types of interaction between the oxidized carbon black and the sulfur-containing amine such as an adsorption or absorption of the amine at the surface or in the bulk of the carbon black, intermolecular bonds such as hydrogen bonds or salt formation or the formation of covalent bonds such as amide bonds.

The chemical nature of the functional groups present on the surface of the particles of the functionalized carbon black according to the invention and as understood herein, is not particularly limited, and can comprise those mentioned above with respect to the oxidized carbon black and those that may be introduced by the sulfur-containing amine, e.g. by a bonding of the sulfur-containing amine to the oxidized carbon black or a reaction of functional groups of the sulfur-containing amine with functional groups of the oxidized carbon black. For example, carboxylic acid groups of the oxidized carbon black may react at elevated temperatures with amine groups of the sulfur-containing primary or secondary amine under the formation of amide bonds. Hence, a covalent amide bond may be formed between oxygen-containing groups of the oxidized surface of the oxidized carbon black and the amine functionality of the sulfur-containing amine component. For example, the amine group(s) of the amine component may react with carboxylic acid, carboxylate, or anhydride groups residing on the surface of the oxidized carbon black particles. The degree of functionalization, i.e. the number of chemical functionalities per unit mass carbon black, of the functionalized carbon black according to the invention can vary. Preferably, a residue of the sulfur-containing primary or secondary amine is thus bound to the oxidized carbon black by a covalent bond, such as an amide bond, in the functionalized carbon black.

As mentioned, the oxidized carbon black material is treated with a sulfur-containing primary or secondary amine or a salt thereof to obtain the functionalized carbon black according to the present invention. The terms "sulfur-containing primary or secondary amine or a salt thereof", "sulfur-containing amine" and alike may be used interchangeably throughout this description unless otherwise stated. The sulfur-containing amine component that can be used according to the present invention can comprise any compound that contains both sulfur (in bound form) and one or more primary or secondary amine group(s). A primary amine group refers to a group of the general structure "—$NH_2$" and a secondary amine group refers to a group of the structure "—NHR", wherein R is an organic substituent such as an alkyl, aryl or aralkyl group. Salts of the sulfur-containing amine can likewise be employed. In other words, the primary and/or secondary amine group(s) can also be present in the corresponding protonated form as ammonium groups.

The sulfur-containing amine used according to the present invention can comprise a monomeric or a polymeric organic compound as well as mixtures or combinations thereof. Typically, it is a monomeric sulfur-containing amine. Its molecular weight can for example be 500 g/mol or less, such as 400 g/mol or less, 200 g/mol or less or 175 g/mol or less. The sulfur-containing amine may for example comprise at least one sulfide, oligosulfide, and/or polysulfide moiety. Furthermore, the sulfur-containing amine comprises at least one, such as at least two or at least three, amine group(s) each individually selected from primary amine groups and secondary amine groups. The primary and/or secondary amine group(s) may be unblocked or blocked. Blocking may for example be achieved by any protective group conventionally known in the art such as, for example, in the form of a carbamate. The sulfur-containing amine component can comprise beside the sulfur and amine functionalities, further chemical functionalities such as for example oxygen-containing groups. It may however also be free of such additional functional groups.

Preferably, the sulfur-containing primary or secondary amine according to the invention comprises a compound of the formula $R^1$—$S_x$—Z—$NR^2R^3$, wherein Z is a divalent organic group comprising 1-20 carbon atoms, x is an integer of at least 1, and $R^1$, $R^2$ and $R^3$ are each individually selected from hydrogen and a monovalent organic group comprising 1-20 carbon atoms such as an alkyl, aryl or aralkyl group. More preferably, Z is an alkylene group comprising 1-8 carbon atoms. Furthermore, $R^1$ can represent a $C_1$-$C_{12}$ alkyl group, wherein optionally one or more hydrogen atoms may be substituted by a functional group such as an amine group according to the formula $-NR^4R^5$, wherein $R^4$ and $R^5$ are each individually selected from hydrogen and a monovalent organic group comprising 1-20 carbon atoms such as an alkyl, aryl or aralkyl group. The integer x is preferably an integer in the range from 2-20, such as from 2-6, Even more preferably, the integer x is equal to 2.

A preferred sulfur-containing primary or secondary amine according to the invention comprises a compound of the formula $S_x(-Z-NR^2R^3)_2$. A specific suitable sulfur-containing primary or secondary amine that can be used in the present invention can be exemplified, without being limited thereto, by cystamine or a salt thereof, such as a respective hydrogen halide salt. Suitable sulfur-containing primary or secondary amines for use in the present invention as described above are commercially available.

The sulfur functionality imparted to the oxidized carbon black by treatment with the sulfur-containing amine component can be utilized to establish strong chemical interactions of the carbon black particles to vulcanizable rubber components. For instance, the sulfur-moiety can form under appropriate reaction conditions covalent bonds such as sulfur bridges to reactive sites of the vulcanizable rubber component such as ethylenically unsaturated moieties.

The functionalized carbon black or its precursor according to the invention can be treated prior, during or after the treatment with the sulfur-containing amine component with one or more other chemical components. By this means, some or all of the particles of the functionalized carbon black can comprise other or additional chemical functionalities on their surface. For example, the oxidized carbon black utilized for preparing the functionalized carbon black can be treated with a chemical that activates, i.e. increases the reactivity of, the oxygen-containing functional groups on the surface of the carbon black particles. Such an additional treatment can increase the yield or the reaction rate of a subsequent chemical treatment step such as in the treatment with the sulfur-containing amine compound. More particularly, the carboxyl groups on the surface of the oxidized carbon black particles can be treated with any chemical component known by those skilled in the art such that an (activated) ester or anhydride is obtained. Suitable (activated) esters or anhydrides are known to be more reactive to amines then the corresponding carboxylic acids and thus can increase the yield of amide functionalities in the treatment with the sulfur-containing amine component. The one or more further chemical components can also be applied together with the sulfur-containing amine component and may act as catalyst or coupling agent by forming an activated complex or a reactive intermediate thereby leading for example to an increased yield of the reaction product. Other chemical components may be applied to the functionalized carbon black or its precursor for delaying or slowing down a chemical reaction such as the reaction with the sulfur-containing amine.

The optional one or more additional or other chemical functionalities introduced to the functionalized carbon black by treatment with one or more other chemical component can also be utilized to introduce an additional chemical reactivity of the functionalized carbon black to chemical groups other than amines. By this means, the functionalized carbon black can, for example, stronger interact with or can be bound by further chemical bonds to the rubber material or other components comprised in the respective carbon black-containing compound.

The functionalized carbon black according to the present invention can for example be obtained by a process comprising (A) providing an oxidized carbon black, (B) contacting the oxidized carbon black with a sulfur-containing primary or secondary amine or a salt thereof, and (C) subjecting the resulting mixture to conditions at which the oxidized carbon black reacts with the sulfur-containing primary or secondary amine or salt thereof. In said process, the sulfur-containing primary or secondary amine or salt thereof and/or the oxidized carbon black material can be as specified above.

The relative amount of the sulfur-containing amine component to the oxidized carbon black can vary. The sulfur-containing amine component can be applied in excess or in shortage based on the number of chemical functionalities of the applied carbon black available for reaction. The sulfur-containing amine component can be added stepwise or all at once.

Contacting of the oxidized carbon black and the sulfur-containing amine component can be carried out by any means known in the art for bringing into contact two components. Typically, it comprises a mixing the oxidized carbon black and the sulfur-containing amine component, which can be conducted using any instrumentation conventionally applied for this purpose. Preferably, contacting the oxidized carbon black and the sulfur-containing amine comprises forming an at least macroscopically homogenous mixture. In case the sulfur-containing amine component is a solid at the mixing temperature, but also for example when only relatively small amounts of the sulfur-containing amine component are provided, a solvent or processing aid such as an oil or the like can be added prior to or while contacting with the oxidized carbon black. The solvent can be chosen such that it dissolves the sulfur-containing amine component. In case the sulfur-containing amine component is a liquid at the mixing temperature, the use of a solvent or processing aid can be omitted. During mixing in step (B) the temperature of the mixture remains typically below levels at which a reaction between the oxidized carbon black and the sulfur-containing amine component would occur, such as below 80° C. or below 60° C. Mixing can for example be carried out at room temperature or slightly elevated temperature (e.g. up to 40° C.). However, higher temperatures can be used as for example in the in-situ preparation described further below.

The mixture can optionally comprise further auxiliary ingredients in addition to the oxidized carbon black and the sulfur-containing amine component. For instance, the mixture can comprise substances acting as coupling agents or catalyst for the coupling reaction and/or for removing protecting groups, if present. In case the functionalized carbon black is provided with additional chemical functionalities as mentioned further above, corresponding reactants can be added prior or after contacting with the sulfur-containing amine component.

The reaction conditions in step (C) of said process can be chosen to enable the formation of amide bonds between the oxidized carbon black and the sulfur-containing amine component. Step (C) can for instance comprise heating the mixture to a temperature of at least 100° C., such as in the range from 100° C. to 160° C., for a period of at least 1 min, such as 2-10 min. Heat can be applied by any conventional means such as by heating rods, heating plates or the like or by agitation at high rotor speeds, respectively high shear forces. Applying heat by agitation is especially advantageous if reaction is induced in-situ in the presence of a vulcanizable rubber component.

As previously mentioned, the reaction of the oxidized carbon black and the sulfur-containing amine component can be conducted in situ, i.e. in the presence of a vulcanizable rubber component, or the functionalized carbon black of the present invention can be formed separately and then compounded with a vulcanizable rubber component and suitable vulcanization agents to form a vulcanizable rubber composition according to the present invention. The in-situ route will be described in more detail below in the context of the preparation of the vulcanizable rubber compositions according to the invention.

The present invention accordingly also concerns a vulcanizable rubber composition comprising (i) a vulcanizable rubber component, (ii) an oxidized carbon black, and (iii) a sulfur-containing primary or secondary amine or a salt thereof. From the oxidized carbon black and the sulfur-containing amine a functionalized carbon black of the present invention may thus be formed in-situ. Alternatively, the functionalized carbon black may be formed separately and then combined with the vulcanizable rubber component. In any case, the present invention thus relates also to a vulcanizable rubber composition that comprises vulcanizable rubber component (i) and a functionalized carbon black formed from the oxidized carbon black (ii) and the sulfur-containing primary or secondary amine or salt thereof (iii).

The term "vulcanizable rubber composition" refers to a composition of a rubber component optionally with various further ingredients conventionally used in the art of rubber compounding that can be cured by vulcanization under formation of a vulcanizate. The terms "curable" and "vulcanizable" are used interchangeably throughout this description unless otherwise stated and refer to a chemical reaction linking polymer chains to each other by means of a crosslinker or vulcanizing agent.

The vulcanizable rubber component suitable for use in the vulcanizable rubber composition comprises one or more rubbers or elastomers containing olefinic unsaturation, i.e. diene-based rubbers or elastomers. The terms "rubber" and "elastomer" may be used interchangeably throughout this description unless otherwise stated. The rubber component may also comprise a mixture of the rubber containing olefinic unsaturation with other polymer materials containing no such unsaturation as for example thermoplastic or thermoset polymers or the like. Preferably, however, the rubber component only comprises one or more rubbers containing olefinic unsaturation. The phrases "rubber containing olefinic unsaturation" and "diene-based rubber" are used interchangeably and are intended to include both natural and synthetic rubbers or mixtures thereof. Natural rubber can be used in its raw form and in various processed forms conventionally known in the art of rubber processing. Without being limited thereto, synthetic diene-based rubber may be any rubber containing at least one diene-based monomer that alone or with other monomers constitutes the rubber. Exemplary diene-based rubber materials suitable in the practice of the invention include, but are not limited to natural rubber, emulsion-styrene-butadiene rubber, solution-styrene-butadiene rubber, polybutadiene, polyisoprene, ethylene-propylene-diene rubber (EPDM), butyl rubber and halogenated butyl rubber, acrylonitrile-butadiene rubber, hydrogenated acrylonitrile-butadiene rubber, polychloroprene, or any combination thereof. The rubber composition according to the present invention can also comprise one or more non-diene-based rubber materials. Exemplary non-diene-based rubber materials suitable in the practice of the invention include, but are not limited to, ethylene-propylene rubber (EPM), chlorinated polyethylene, chlorosulfonated polyethylene, acrylate rubber, ethylene-vinylacetate rubber, ethylene-acrylic rubber, epichlorohydrin rubber, silicone rubber, fluorosilicone rubber, fluorocarbon rubber or any combination thereof. Suitable rubbers also include functionalized rubbers and rubbers coupled to silicon or tin. For example, rubbers can be functionalized with functional groups like amine, alkoxy, silyl, thiols, thioesters, thioether, sulfanyl, mercapto, sulfide or combinations thereof. The one or more functionalities can be primary, secondary or tertiary and can be located at one or both chain ends (e.g. $\alpha,\omega$-functionalization), pendant from the polymer backbone and/or provided within the chain of the polymer backbone. The rubber according to the invention can also be partially cross-linked. Thus, prior to use in the vulcanizable rubber composition, part of the polymer chains of the rubber material can be cross-linked either by means of a coupling agent or without. The polymeric material can furthermore be supplied in any form, typically however as bales or chips.

Preferably, the rubber component comprises a mixture of natural and synthetic diene-based rubbers. A non-limiting specific rubber material that can be used in the practice of the present invention is for example Sprintan SLR 4630 commercially available from Trinseo Deutschland GmbH.

The vulcanizable rubber composition may comprise the oxidized carbon black or the functionalized carbon black derived therefrom in an amount of 10 to 100 phr such as of 40-80 phr. As used herein, the term "phr" refers to parts by weight of the recited respective material per 100 parts by weight of rubber or elastomer. The vulcanizable rubber composition according to the invention furthermore may comprise the sulfur-containing primary or secondary amine or salt thereof in an amount of 0.1 to 10 phr such as 0.2 to 5 phr or 0.3 to 3 phr, preferably of 0.3 to 2 phr such as 0.5 to 1.5 phr. Thereby, the sulfur-containing primary or secondary amine can be used in the form of a salt such as in form of an ammonium or hydrogen halide salt.

The vulcanizable rubber composition according to the present invention optionally may further comprise at least one vulcanizing agent able to induce cure of the rubber. Possible vulcanizing agents include any vulcanizing agents known from the art such as sulfur and sulfur donors. Sulfur donors suitable for the practice of the present invention include for example dithioalkanes, dicaprolactamsulfides, polymeric polysulfides, sulfur olefin adducts, thiurams and sulfonamides with at least two sulfur atoms in the sulfur bridges. Preferably elemental sulfur may be used. The vulcanizing agent can be present in an amount ranging from 0.5 to 8 phr, such as from 1 to 4 phr, in the vulcanizable rubber composition.

Further, the vulcanizable rubber composition preferably comprises a base such as a basic metal oxide and/or a metal hydroxide. Suitable basic metal oxides can be exemplified by oxides of alkaline metals or alkaline earth metals such as $Na_2O$, $K_2O$, $CaO$ or $MgO$. Suitable metal hydroxides can be exemplified by hydroxides of alkaline metals or alkaline earth metals such as $NaOH$, $Mg(OH)_2$ or $Ca(OH)_2$. These components may be included to support in-situ functionalization of the oxidized carbon black with the sulfur-containing amine as they may neutralize acidic byproducts, adsorb water and/or act as cure activators. The basic metal oxide and the metal hydroxide may each independently be comprised at an amount in the range of 0.1 phr to 5 phr such as from 1 phr to 3 phr.

The vulcanizable rubber composition may further comprise one or more further filler materials such as for example other carbon blacks, silica, organo-silica, carbon nanotubes, carbon fibers, graphite, metal fibers or the like. Carbon blacks useful in this respect can be exemplified by the ASTM-grade carbon blacks selected from the 100er to the 900er series as classified according to ASTM D1765.

The vulcanizable rubber composition according to the invention may further comprise other commonly known additives. Such additives include, for example, curing aids such as primary and secondary vulcanization accelerators, activators, and pre-vulcanization inhibitors, processing additives such as oils, resins in form of tackifying resins and plasticizers, softeners, pigments, waxes, peptizing agents and antiaging agents such as anti-oxidants and anti-ozonants. Useful as primary and secondary vulcanization accelerators are for example guanidines, dicarbamates, dithiocarbamates, thiurams, thioureas, 2-mercaptobenzothiazole, benzothiazole sulfonamides, aldehydeamines, amines, disulfides, thiazoles, xanthates, and sulfenam ides. As specific examples it may be referred for instance to N-tert.-butyl-2-benzothiazyl sulfenamide commercially available under the tradename Rhenogran TBBS-80 from Rhein Chemie Additives and diphenylguanidine commercially available as Rhenogran DPG-80 from Rhein Chemie Additives. Suitable activators include combinations of zinc oxide or the like with a fatty acid like stearic, lauric, palmitic, oleic or naphthenic acid. Primary accelerators can be present in the composition in a total amount ranging from 0.05 to 4 phr. Secondary accelerators are typically employed in smaller amounts than primary accelerators and can be present in the composition in an amount ranging from 0.05 to 3 phr.

As it will be appreciated, the vulcanizable rubber compositions according to the invention can be utilized in various technical applications requiring rubber-based materials with reduced loss hysteresis, enhanced filler-rubber bonding and/or increased abrasion resistance. Accordingly, the invention also relates to an article made from or comprising the afore-mentioned vulcanizable rubber composition. Non-limiting examples of such articles are for instance tires, tire components such as tire treads or sidewalls, cable sheaths, tubes, drive belts, conveyor belts, roll coverings, shoe soles, sealing members, profile or damping elements. Due to the exceptional combination of low hysteresis and high abrasion resistance, the vulcanizable rubber composition according to the present invention is particularly interesting for producing abrasion-resistant, fuel-saving tires or tire components with a reduced rolling resistance and heat build-up. Such tires include for example, without being limited thereto, truck tires, passenger tires, off-road tires, aircraft tires, agricultural tires, and earth-move tires.

The vulcanizable rubber composition according to the invention can be obtained by a process in which the functionalized carbon black is produced ex-situ or in-situ., i.e. in the absence respectively presence of the vulcanizable rubber component. Thus, the present invention also relates to a process for preparing a vulcanizable rubber composition comprising contacting an oxidized carbon black with a sulfur-containing primary or secondary amine or a salt thereof, and subjecting the resulting mixture to conditions at which the oxidized carbon black reacts with the sulfur-containing primary or secondary amine or salt thereof to form a functionalized carbon black, wherein a vulcanizable rubber component is mixed with the oxidized carbon black and the sulfur-containing amine component or the functionalized carbon black derived therefrom before, during and/or after subjecting the mixture to conditions at which the oxidized carbon black reacts with the sulfur-containing amine component.

In a preferred practice of the invention, the functionalized carbon black is formed in the presence of the vulcanizable rubber composition. Thus, the vulcanizable rubber component is preferably mixed with the oxidized carbon black and the sulfur-containing amine compound before or during subjecting the mixture to conditions at which the oxidized carbon black reacts with the sulfur-containing amine compound.

The process can further comprise addition of a basic metal oxide and/or a metal hydroxide such as the ones mentioned above during, before or after mixing the oxidized carbon black and the sulfur-containing amine compound with the rubber component. Preferably, the metal oxide and the metal hydroxide are added to the carbon black and the sulfur-containing amine compound together with the rubber component.

Mixing can be carried out such that the oxidized carbon black material, the sulfur-containing amine component, the vulcanizable rubber component, and, if present, the metal oxide and/or metal hydroxide, and any further optional components, if used, are at least partially mixed together. Preferably all components are completely mixed together such that an at least macroscopically homogenous mixture is obtained.

The process can comprise before mixing the vulcanizable rubber component with the oxidized carbon black and the amine compound, a step in which the vulcanizable rubber component is plasticized, for example, by means of agitation. To this end, the vulcanizable rubber component can be provided in an eligible instrument, such as an internal mixer, and can be agitated for 2 minutes or less, such as for 1 minute or less, such as for 45 seconds. Subsequently, the oxidized carbon black, the sulfur-containing amine component and potential further optional components can be added to the plasticized vulcanizable rubber component and can be mixed together as disclosed above.

Mixing can be carried out using techniques and instrumentation conventionally known in the art of rubber processing. Mixing can be achieved, for example, by a mixer, a stirrer, a mill, a kneader, a machine using ultrasound, a dissolver, a shaker mixer, rotor-stator dispersing assemblies, or high-pressure homogenizers or a combination thereof. Preferably, a mixer with intermeshing or tangential rotor geometry is utilized.

Mixing can include, if needed, heating the components of the mixture to temperatures above the room temperature. Preferably, however, mixing is carried out without providing extra heat to the mixture beside the heat which may be generated by the agitation process itself. The temperature generated from the agitation process can be utilized to subject the mixture to conditions at which the oxidized carbon black reacts with the sulfur-containing amine component to form a functionalized carbon black. The conditions during mixing can be chosen such that amide bonds between for example carboxyl groups of the oxidized carbon black and amine group of the sulfur-containing amine component are formed. Thereby, the temperature of the mixture is typically kept below 200° C., preferably, at about 150° C. by gradually or stepwise modifying the rotor speed, if needed.

Mixing can be carried out such that the oxidized carbon black reacts with the sulfur-containing amine component under formation of a functionalized carbon black during homogenization with the rubber component and with optional further components, i.e. homogenization and reaction occur in a single mixing step. In a preferred practice of the invention, however, the oxidized carbon black, the sulfur-containing amine component, the rubber component and optional further components are at least macroscopically homogenized in a first mixing step and the thus obtained mixture is allowed to cool down to room temperature before subjecting the components of the mixture to a second mixing step. Depending on the specific mixing conditions during the two mixing steps, reaction between the oxidized carbon black and the sulfur-containing amine component may occur in the first and/or the second mixing step.

The duration of the first mixing step can vary. However, depending on the chemical nature of the components, mixing time can be critical. For example, some of the components can be sticky, in which case extensive mixing on the open mill should be avoided. Typically, the mixing time in the first step is below 10 minutes such as below 5 minutes, below 2 minutes, such as 90 seconds. The ejection temperature of the composition in the first mixing step is typically kept below 190° C., preferably, however, between 130° C. and 150° C.

After the first mixing step, the resulting mixture can immediately be subjected to the second mixing step or can be stored in between the two steps. The mixture can for example be allowed to stand for a few minutes to months, such as for at least 60 minutes, or for at least 12 hours. Prior to the second mixing step, the mixture can be transferred to another mixing chamber and/or to another site, such as for example to a customer.

In the second mixing step the mixture is typically agitated using for example an internal mixer with intermeshing rotor geometry. Rotor speed can be in the range of 10 to 150 rpm, preferably of 80 to 120 rpm, which can lead to a heating of the mixture such that no additional heating source has to be applied. The duration of the second mixing step can be in the range of seconds to hours, such as for example from 1 minute or 5 minutes up to 2 hours or up to 30 minutes. The rotor speed can be adjusted during that time to keep the temperature of the mixture at a certain level, e.g. in a range from 120° C. to 200° C. or 140° C. to 180° C., such as at about 150° C.

After the first, or if present, the second mixing step, the process for preparing a vulcanizable rubber composition further preferably comprises a step of adding sulfur or a sulfur donor or another vulcanization agent, and, if needed, one or more activators, one or more accelerators and further components conventionally used in the art of rubber compounding as mentioned above to the mixture. Subsequently, the composition is preferably mechanically agitated in order to achieve at least partial or preferably complete mixing of the composition. The mixing is typically carried out at temperatures residing between 10° C. and 140° C., more typically between 80° C. and 120° C., under constant agitation for less than 5 min, such as less than 3 min. The conditions, especially the rotor speed, can be chosen such that the temperature of the mixture containing the curing agents resides below 110° C.

The in this way obtained mixture can be cured, i.e. vulcanized. By this means, in addition to cross-linking of the polymer chains of the rubber material also a linkage of the functionalized carbon black particles to the rubber matrix can be achieved via the sulfur functionality introduced by the sulfur-containing amine to the surface of the carbon black particles. This linkage is believed to increase the carbon black-elastomer interactions.

Curing can be carried out using conventional curing means and conditions known as such in the art of rubber processing. For example, curing of the vulcanizable rubber composition according to the invention can be carried out by subjecting the mixture to thermal curing conditions, e.g. to a temperature of 120-200° C. for a time of 5 minutes to 3 hours. Curing can for instance be carried out in a curing press for example at a temperature of 160° C. for 60 minutes at a pressure between 120 and 150 bar.

The invention will now be further illustrated by the following Examples. It is to be understood that the Examples are included for the sake of illustration, and are not to be construed as limiting to the present invention. In particular, the sought scope of protection shall not be limited by the specific Examples disclosed hereinafter, but is rather to be given the full breadth of the appended claims including any equivalents thereof.

EXAMPLES

All parts and percentages mentioned herein are based on weight, unless indicated otherwise.

Applied Carbon Black Materials

As oxidized carbon black (CB), EB287 was utilized, which has the properties summarized in Table 1, and which is commercially available from Orion Engineered Carbons GmbH.

As a reference, a non-oxidized carbon black grade, PRINTEX® 60, which is commercially available from Orion Engineered Carbons GmbH was utilized. Its properties are likewise included in Table 1.

TABLE 1

| | Oxidized CB | Reference CB |
|---|---|---|
| BET [m$^2$/g] | 117-120 | 108 |
| STSA [m$^2$/g] | 91-93 | 93 |
| OAN [mL/100 g] | 118-122 | 108 |
| COAN [mL/100 g] | 95-98 | 88 |
| pH | 2.5-2.7 | 9.8 |
| Volatiles @ 950° C. [%] | 4.3-5.3 | 0.59 |
| Carboxylic acid groups [µmol/g] | 195-269 | <50 |
| Carbon content [wt. %] | 95.1-96.0 | 99.31 |
| Oxygen content [wt. %] | 2.5-3.6 | 0.24 |

Applied Methods for the Characterization of the Carbon Blacks

The BET surface area was measured by nitrogen adsorption in accordance with ASTM D6556-17.

The statistical thickness surface area (STSA) was determined according to ASTM D6556-17.

The oil absorption number (OAN) was measured according to ASTM D2414-18.

The oil absorption number for compressed samples (COAN) was determined according to ASTM D3493-18.

pH was measured according to D1512-15b, Test Method B—Sonic Slurry.

Volatiles at 950° C. were measured using a thermogravimetric instrument of Fa. LECO Instrumente GmbH (TGA-701) according to the following protocol: Pans were dried at 650° C. for 30 min. The carbon black materials were stored in a desiccator equipped with desiccant prior to measurements. Baked-out pans were loaded in the instrument, tared and filled with between 0.5 g to 10 g carbon black material. Then, the oven of the TGA instrument loaded with the sample-filled pans was gradually heated up to 105° C. by automated software control and the samples were dried until a constant mass was achieved. Subsequently, the pans were closed by lids, the oven was purged with nitrogen (99.9 vol % grade) and heated up to 950° C. The oven temperature was kept at 950° C. for 7 min. The content of volatiles at 950° C. was calculated using the following equation:

$$\text{Volatiles} = \frac{m(\text{prior to heating}) - m(\text{after 7 minutes @950°C})}{m(\text{prior to heating})} \cdot 100\%.$$

Carboxylic acid groups per unit mass carbon black were determined according to the following protocol: The carbon black was dried overnight in a compartment drier set at a temperature of 125° C. The hot carbon black material was removed from the drier and allowed to cool down in a desiccator containing a desiccant. In three thoroughly cleaned and dried Erlenmeyer flasks each mcB=1.5±0.1 g carbon black material were weighed and to each 25 mL 0.05 molar aqueous sodium hydroxide solution (Titrisol grade diluted in bi-distilled water) were added. Air inside the flasks was replaced by nitrogen gas and flasks were sealed by plugs additionally secured by taping with parafilm. Flasks were placed in a shaker overnight at 240 rpm. After that, the resulting suspensions were pressure filtered using nitrogen gas at a pressure of 5 bar. Of each filtrate 10 mL were transferred in a beaker. 10 mL of 0.025 molar sulfuric acid (Titrisol grade diluted in bi-distilled water) were added to each beaker and carbonate was removed by boiling up for a short time. Subsequently, the samples were titrated back to pH 6.5 using 0.05 molar sodium hydroxide solution (Titrisol grade diluted in bi-distilled water). The required volume of sodium hydroxide solution $V_{NaOH}$ was determined in mL at a precision of three digits behind the comma. Two blanks were measured and the required volumes of sodium hydroxide solution were averaged ($V_{blank,averaged}$). The concentration of carboxyl groups in μmol/g was calculated for all three samples using the following formula and the resulting values were averaged.

$$[\text{Carboxyl groups}] = 25 \cdot \frac{V_{NaOH} - V_{blank,averaged}}{10 \cdot m_{CB}} \cdot 0.05 \cdot 1000$$

Preparation of Vulcanizable Rubber Compositions

Rubber compositions of the formulations set forth in Table 2 were prepared according to the following procedure using the afore-mentioned oxidized and reference carbon blacks together with different amounts of cystamine as sulfur-containing amine.

The preparation was performed using a 3-step mixing procedure. Each mixing step was conducted in an internal mixer with intermeshing rotor geometry (GK 1.5 E). This was followed by cooling down and further mixing on an open mill.

At first, the rubber component was added to the mixing chamber of the internal mixer and was plasticized for 45 seconds. After that the carbon black filler, Ca(OH)$_2$, MgO and cystamine*2 HCl were added and mixed for 90 seconds. The ram was lifted and cleaned followed by additional 135 seconds of mixing. It was secured that the maximum temperature did not reach more than 160° C. during this step.

After storing for at least 12 h, the mixture was heated up to 150° C. in the internal mixer in a second mixing step by applying maximum rotor speed (104 rpm). The temperature was roughly kept for 2.5 minutes by adjusting the rotor speed.

Subsequently, ZnO, stearic acid, sulfur, TBBS-80 and DPG-80 were added to the mixture and agitated for 2 minutes such that a vulcanizable rubber composition was obtained. It was secured that the maximum temperature did not reach more than 110° C. during this step.

TABLE 2

| Ingredient (amounts in parts by weight elastomer, phr) | Ex. 1* | Ex. 2* | Ex. 3* | Ex. 4* | Ex. 5 | Ex. 6 | Ex. 7 | Ex. 8 | Ex. 9 |
|---|---|---|---|---|---|---|---|---|---|
| Sprintan SLR 4630[1] | 137.5 | 137.5 | 137.5 | 137.5 | 137.5 | 137.5 | 137.5 | 137.5 | 137.5 |
| Reference CB | 60 | 60 | — | — | — | — | — | — | — |
| Oxidized CB | — | — | 60 | 60 | 60 | 60 | 60 | 60 | 60 |
| Cystamine[2] | — | 5 | — | — | 1 | 2 | 4 | 5 | 7 |
| Elastomag 170[3] | — | 2 | — | 2 | 2 | 2 | 2 | 2 | 2 |
| Innovox OH | — | 2 | — | 2 | 2 | 2 | 2 | 2 | 2 |
| ZnO | 2 | 2 | 2 | 2 | 2 | 2 | 2 | 2 | 2 |
| Stearic acid | 2 | 2 | 2 | 2 | 2 | 2 | 2 | 2 | 2 |
| Rhenogran TBBS-80[5] | 1.7 | 1.7 | 1.7 | 1.7 | 1.7 | 1.7 | 1.7 | 1.7 | 1.7 |
| Rhenogran DPG-80[6] | 2 | 2 | 2 | 2 | 2 | 2 | 2 | 2 | 2 |
| Sulfur | 1.5 | 1.5 | 1.5 | 1.5 | 1.5 | 1.5 | 1.5 | 1.5 | 1.5 |

[1]SSBR commercially available from Trinseo Deutschland GmbH
[2]Cystamine (as dihydrochloride), commercially available from Sigma-Aldrich Chemie GmbH
[3]Magnesium oxide, commercially available from Nordmann, Rassmann GmbH
[4]: Calcium hydroxide, commercially available from Nordmann, Rassmann GmbH
[5]Accelerator, commercially available from Rhein Chemie Additives
[6]Accelerator, commercially available from Rhein Chemie Additives
*Reference Example Curing of the Vulcanizable Rubber Compositions The vulcanizable rubber compositions were subjected to curing in a curing press for 60 minutes at 160° C. The applied pressure was between 120 and 150 bar.

Characterization of the Cured Rubber Compositions

Mooney-Viscosity (ML(1+4) 100° C.) was measured according to ISO 289-1:2015.

Hardness was measured according to DIN 53 505.

Tensile strength, elongation at break and Modulus 200 were measured according to DIN 53 504.

Ball rebound was measured according to a test method based on ASTM 3574 and DIN ISO 8307 carried out as follows: A cylindrical test sample with 35 mm in diameter and 19 mm in height was heated up to 60±0.2° C. It was assured that the circular areas of the test sample were smooth and parallel to each other. A steel ball with a diameter of 19 mm was allowed to fall from a drop height of 500 mm through a falling tube on one of the circular areas of the test sample. The height corresponds to the distance between the lowest point of the steel ball and the point of impact on the test sample. The time interval between the first and the second impact of the steel ball on the test sample was measured by a light barrier located closely above the point of impact on the test sample. The time resolution of the light barrier was $10^{-4}$s. The time intervals measured in five runs per test sample were averaged and were applied to calculate the rebound height. The rebound height was then again utilized to calculate the ball rebound, which corresponds to the percental ratio of the rebound height to the drop height.

DIN-abrasion was tested according to DIN ISO 4649: 2014-03.

Heat build-up was tested according to DIN 53533 applying a pre-tension of 1 MPa and a stroke of 4.45 mm. The chamber temperature is 55° C.

Loss factor tan δ and complex modulus E* were measured according to DIN 53 513 in strain-controlled mode (1±0.5 mm) on a cylindrical specimen (10 mm in height and 10 mm in diameter) at 60° C. with a frequency of 16 Hz.

Bound rubber was measured according to the following procedure: A rubber sample of about 0.2 g was cut in small pieces, weighed using an analytical balance and placed in a wire basket (320-mesh, stainless, 22 mm diameter, 40 mm in height) filled with glass wool in such a way that the sample did not come in contact with the wire basket. The sample-containing basket was placed in a 100 mL flask with screw cap and 50-60 mL toluene (analytical grade) were added to result in a minimum filling level of 20 mm above the bottom of the flask. The flask was allowed to stand for 7 days at a temperature of 23±2° C., whereby the flask was swirled every morning and evening. The toluene was replaced after 1 to 3 days. After the 7 days, the basket with the bound rubber gel therein was removed from the flask and allowed to emit the solvent overnight in a fume hood. Subsequently, the sample was dried overnight in a compartment drier until mass was constant. After allowing to cool down to room temperature in a desiccator, the sample was weighed (m(dried gel)). The portion of bound rubber in weight-% based on the mass of the original sample was calculated using the following formula:

$$\text{Bound Rubber} = \frac{m_{dried\,gel} - m_{filler,original\,sample}}{m_{polymer,original\,sample}} \cdot 100\%$$

It was assumed that the mass of the carbon black filler in the gel is the same as the mass of the carbon black filler in the original sample (m(filler, original sample)).

The thus obtained results are summarized in Table 3.

TABLE 3

| Property | Ex. 1* | Ex. 2* | Ex. 3* | Ex. 4* | Ex. 5 | Ex. 6 | Ex. 7 | Ex. 8 | Ex. 9 |
|---|---|---|---|---|---|---|---|---|---|
| ML(1 + 4) 100° C. [MU] | 67 | 87 | 72 | 73 | 77 | 80 | 84 | 88 | 84 |
| Hardness [Sh. A] | 51 | 58 | 52 | 51 | 52 | 54 | 55 | 58 | 61 |
| Tensile strength [MPa] | 15.7 | 16.3 | 17.6 | 18.8 | 13.9 | 12.6 | 15.6 | 15.5 | 13.7 |
| Elongation at break [%] | 490 | 450 | 430 | 480 | 310 | 300 | 330 | 310 | 270 |
| Modulus 200 [MPa] | 4.1 | 5.7 | 5.6 | 4.9 | 6.8 | 6.5 | 7.0 | 7.9 | 8.8 |
| Dynamic modulus E* 1 ± 0.5 mm, 60° C., 16 Hz | 4.72 | 5.98 | 4.97 | 4.42 | 5.19 | 5.33 | 5.57 | 6.15 | 6.41 |
| tan δ 1 ± 0.5 mm, 60° C., 16 Hz | 0.179 | 0.164 | 0.107 | 0.118 | 0.092 | 0.097 | 0.106 | 0.125 | 0.116 |
| Heat build-up [° C.] | 63 | 62 | 52 | 51 | 50 | 50 | 50 | 50 | 48 |
| Ball rebound, 60° C. [%] | 52 | 54 | 62 | 62 | 65 | 64 | 63 | 60 | 62 |
| DIN abrasion [mm³] | 193 | 197 | 192 | 209 | 156 | 159 | 164 | 158 | 172 |
| Bound rubber [%] | 21 | 39 | 43 | 49 | 52 | 53 | 53 | 49 | 53 |

*Reference Example

The results of Table 3 indicate that rubber articles with significantly improved hysteresis properties as evidenced by a reduced loss factor tan δ, reduced heat-build up, increased ball rebound and/or increased bound rubber can be obtained by the use of an oxidized carbon black in the rubber composition versus a corresponding reference carbon black which has not been oxidatively treated (cf. Example 3 versus Example 1). This effect can be further enhanced when the oxidized carbon black is treated with a sulfur-containing amine as evidenced by Examples 5-9 compared to Example 3. As indicated by Table 3, the use of the functionalizing sulfur-containing amine additionally improves the indicators for durability and reinforcement. This is reflected by a lower amount of abraded material in the DIN abrasion test. Furthermore, the combination of an oxidized carbon black and a sulfur-containing amine improves both the static and the dynamic stiffness of the resulting rubber compound, which are reflected by increased Modulus 200 and E* values, respectively. These effects are not observed or to a much lesser extent when the rubber composition includes the reference carbon black which has not been oxidatively treated (cf. Example 2). Moreover, addition of MgO and Ca(OH)$_2$ without the sulfur-containing amine component in the preparation of the rubber composition, conversely leads to some decrease of the modulus and an increase of the tensile strength, and does not affect the hysteresis related properties (cf. Example 4 versus Example 3). This indicates the significance of both, the presence of the sulfur-containing amine and an oxidized carbon black reactive therewith, for achieving the afore-mentioned beneficial combination of properties. Particularly favorable properties are obtained when relatively low amounts of the functionalizing agent are used with respect to the amount of carbon black (cf. Examples 4 and 5).

The invention claimed is:

1. A functionalized carbon black obtained by treating an oxidized carbon black with a sulfur-containing primary or secondary amine or a salt thereof,
wherein the sulfur-containing primary or secondary amine comprises a compound of the formula $R^1$—$S_x$—Z—$NR^2R^3$ or $S_x$ (—Z—$NR^2R^3$)$_2$, wherein
Z is a divalent $C_1$-$C_8$ alkylene group,
x is an integer of at least 1, and
$R^1$, $R^2$ and $R^3$ are each individually selected from hydrogen and a monovalent organic group comprising 1-20 carbon atoms.

2. The functionalized carbon black according to claim 1, wherein a residue of the sulfur-containing primary or secondary amine is bound to the oxidized carbon black by a covalent bond.

3. The functionalized carbon black according to claim 1, wherein the sulfur-containing primary or secondary amine is a monomeric organic compound and/or has a molecular weight of less than 500 g/mol.

4. The functionalized carbon black according to claim 1, wherein the sulfur-containing primary or secondary amine or salt thereof comprises cystamine or a salt thereof.

5. The functionalized carbon black according to claim 1, wherein the oxidized carbon black comprises carboxylic acid groups in an amount of at least 50 µmol/g.

6. A process for preparing a functionalized carbon black comprising:
(A) providing an oxidized carbon black,
(B) contacting the oxidized carbon black with a sulfur-containing primary or secondary amine or a salt thereof, wherein the sulfur-containing primary or secondary amine comprises a compound of the formula $R^1$—$S_x$—Z—$NR^2R^3$ or $S_x$ (—Z—$NR^2R^3$)$_2$, wherein
Z is a divalent $C_1$-$C_8$alkylene group,
x is an integer of at least 1, and
$R^1$, $R^2$ and $R^3$ are each individually selected from hydrogen and a monovalent organic group comprising 1-20 carbon atoms, and
(C) subjecting the resulting mixture to conditions at which the oxidized carbon black reacts with the sulfur-containing primary or secondary amine or salt thereof.

7. The process according to claim 6, wherein step (C) comprises heating the mixture to a temperature of at least 100° C. for a period of at least 1 min.

8. A vulcanizable rubber composition comprising:
a vulcanizable rubber component (i) and a functionalized carbon black formed from an oxidized carbon black (ii) and a sulfur-containing primary or secondary amine or salt thereof (iii),
wherein the sulfur-containing primary or secondary amine comprises a compound of the formula $R^1$—$S_x$—Z—$NR^2R^3$ or $S_x$ (—Z—$NR^2R^3$)$_2$, wherein
Z is a divalent $C_1$-$C_8$alkylene group,
x is an integer of at least 1, and
$R^1$, $R^2$ and $R^3$ are each individually selected from hydrogen and a monovalent organic group comprising 1-20 carbon atoms.

9. The vulcanizable rubber composition according to claim 8, wherein the vulcanizable rubber component comprises natural rubber, emulsion-styrene-butadiene rubber, solution-styrene-butadiene rubber, polybutadiene, polyisoprene, ethylene-propylene-diene rubber EPDM, ethylene-propylene rubber EPM, halogenated butyl rubber, butyl rubber, chlorinated polyethylene, chlorosulfonated polyethylene, acrylonitrile-butadiene rubber, hydrogenated acrylonitrile-butadiene rubber, polychloroprene, acrylate rubber, ethylene-vinylacetate rubber, ethylene-acrylic rubber, epichlorohydrin rubber, silicone rubber, fluorosilicone rubber, fluorocarbon rubber or a combination thereof.

10. The vulcanizable rubber composition according to claim 8, wherein the functionalized carbon black derived therefrom is present in an amount of 10 to 100 phr and/or wherein the sulfur-containing primary or secondary amine or salt thereof is used in an amount of 0.1 to 10 phr.

11. The vulcanizable rubber composition according to claim 8, wherein the sulfur-containing primary or secondary amine is used in the form of a corresponding ammonium salt and/or the composition further comprises a base.

12. A process for preparing a vulcanizable rubber composition comprising:
contacting an oxidized carbon black with a sulfur-containing primary or secondary amine or a salt thereof, wherein the sulfur-containing primary or secondary amine comprises a compound of the formula $R^1$—$S_x$—Z—$NR^2R^3$ or $S_x$ (—Z—$NR^2R^3$)$_2$, wherein
Z is a divalent $C_1$-$C_8$ alkylene group,
x is an integer of at least 1, and
$R^1$, $R^2$ and $R^3$ are each individually selected from hydrogen and a monovalent organic group comprising 1-20 carbon atoms, and
subjecting the resulting mixture to conditions at which the oxidized carbon black reacts with the sulfur-containing primary or secondary amine or salt thereof to form a functionalized carbon black;
wherein a vulcanizable rubber component is mixed with the oxidized carbon black and the sulfur-containing amine component or the functionalized carbon black derived therefrom before, during and/or after subjecting the mixture to conditions at which the oxidized carbon black reacts with the sulfur-containing amine component.

13. An article prepared from a vulcanizable rubber composition according to claim 8.

14. The article according to claim 13 being a tire, a tire component, a tire tread, a cable sheath, a tube, a drive belt, a conveyor belt, a roll covering, a shoe sole, a sealing member, a profile or a damping element.

15. The functionalized carbon black according to claim 2, wherein a residue of the sulfur-containing primary or secondary amine is bound to the oxidized carbon black by an amide bond.

16. The functionalized carbon black according to claim 1, wherein x is an integer in the range from 2-20, and $R^1$ represents a $C_1$-$C_{12}$ alkyl group.

17. The functionalized carbon black according to claim 1, wherein one or more hydrogen atoms are substituted by an amine group-$NR^4R^5$, wherein $R^4$ and $R^5$ are each individually selected from hydrogen and a monovalent organic group comprising 1-20 carbon atoms.

18. The functionalized carbon black according to claim 4, wherein the sulfur-containing primary or secondary amine or salt thereof comprises a respective ammonium halide salt.

19. The vulcanizable rubber composition according to claim 11, wherein the base comprises a basic metal oxide or hydroxide selected from the group consisting of $Ca(OH)_2$ and MgO.

* * * * *

UNITED STATES PATENT AND TRADEMARK OFFICE
CERTIFICATE OF CORRECTION

PATENT NO. : 12,391,817 B2
APPLICATION NO. : 17/624035
DATED : August 19, 2025
INVENTOR(S) : Hauke Westenberg et al.

Page 1 of 1

It is certified that error appears in the above-identified patent and that said Letters Patent is hereby corrected as shown below:

On the Title Page

Column 1, item (72) Inventors, Line 4, delete "Eppstein (DE);" and insert -- Talavera (PY); --

In the Claims

Column 19, Line 7, Claim 1, delete "$S_x ( -Z -NR^2R^3)_2$," and insert -- $S_x( -Z -NR^2R^3)_2$, --

Column 19, Line 34, Claim 6, delete "$S_x ( -Z -NR^2R^3)_2$," and insert -- $S_x( -Z -NR^2R^3)_2$, --

Column 19, Line 35, Claim 6, delete "$C_1$-$C_8$alkylene" and insert -- $C_1$-$C_8$ alkylene --

Column 19, Line 53, Claim 8, delete "$S_x ( -Z -NR^2R^3)_2$," and insert -- $S_x( -Z -NR^2R^3)_2$, --

Column 19, Line 54, Claim 8, delete "$C_1$-$C_8$alkylene" and insert -- $C_1$-$C_8$ alkylene --

Column 20, Lines 8-9, Claim 10, delete "black derived therefrom" and insert -- black --

Column 20, Line 22, Claim 12, delete "$S_x ( -Z -NR^2R^3)_2$," and insert -- $S_x( -Z -NR^2R^3)_2$, --

Column 20, Line 54, Claim 17, delete "group-$NR^4R^5$," and insert -- group -$NR^4R^5$, --

Signed and Sealed this
Fourteenth Day of October, 2025

John A. Squires
*Director of the United States Patent and Trademark Office*